United States Patent [19]
Breitschaft

[11] 3,878,162
[45] Apr. 15, 1975

[54] FLAME-RETARDANT FINISHING OF THERMOPLASTS
[75] Inventor: Siegfried Breitschaft, Augsburg, Germany
[73] Assignee: Hoechst Aktiengesellschaft, Frankfurt/Main, Germany
[22] Filed: July 30, 1973
[21] Appl. No.: 383,783

[30] Foreign Application Priority Data
Aug. 2, 1972 Germany............................ 2237875

[52] U.S. Cl....260/45.7 P; 117/138.8 F; 117/138.8 N; 117/139.5 C: 260/40 R
[51] Int. Cl............................................ C08d 11/04
[58] Field of Search..................... 260/45.7 P, 40 R; 117/138.8 N, 138.8 F, 139.5 C

[56] References Cited
UNITED STATES PATENTS
3,347,818 10/1967 Howe .............................. 260/45.7 P
3,373,135 3/1968 Jenker et al..................... 260/45.7 P
3,778,407 12/1973 Hild et al........................ 260/45.7 P Primary Examiner—Melvyn I. Marquis
Attorney, Agent, or Firm—Connolly and Hutz

[57] ABSTRACT

A flame retardant finishing is given to inflammable thermoplasts, such as linear polyesters and polyamides, by intensely mixing the granular thermoplasts with red phosphorus and a mono-, di-, or tri-ester of orthophosphoric acid until the granules are provided with a flame retardant coating. Suitable esters are those with high molecular weight aliphatic alcohols and phenols or their ethoxylation products.

4 Claims, No Drawings

FLAME-RETARDANT FINISHING OF THERMOPLASTS

The present invention relates to a process for flameretardant finishing of inflammable thermoplasts.

It is known to give inflammable thermoplasts, casting resins, cellular plastics and rubber mixtures an effective protection against burning by incorporation of red phosphorus (of. German Pat. No. 1,173,641; German Offenlegungsschriften 1,812,521; 1,931,387; 1,944,056 and 2,133,557, U.S. Pat. No. 3,373,135). Because of its being readily inflammable, finegrained and strongly dusting red phosphorus is difficult to incorporate into the plastics mass. In order to obviate fire hazard, it has been proposed to use the phosphorus in admixture with 10 to 75 % by weight of lactam (of. German Offenlegungsschrift 1,965,635). This mode of operation has the drawback that during or after incorporation of the mixture into the thermoplast the lactam must be removed substantially or at least partially.

It has now been found that mixtures of red phosphorus and granules of thermoplasts, which can be handled in simple manner and without danger and which can be further processed in any desired way, can be obtained by coating the said granules with the red phosphorus with the use of an organic phosphorus compound having more or less flame retardant properties as adhesion promotor.

The present invention therefore provides a process for coating granules of inflammable thermoplasts with red phosphorus to give them a flame retardant finishing, which comprises intensely mixing, in an atmosphere of an inert gas, granules of thermoplast with up to 45 % of their weight of finely pulverized red phosphorus and 2 to 15 % by weight, calculated on the red phosphorus, of a mono-, di-, or triester of orthophosphoric acid of the formulae $H_2RPO_4$, $HR_2PO_4$ and $R_3PO_4$, in which R represents the radical of a straight chain or branched aliphatic alcohol having from 2 to 18 carbon atoms, the radical of a phenol carrying at most three alkyl side chains having from 1 to 9 carbon atoms, or the radical of an alcohol obtained by reacting the alcohols or phenols from which the aforesaid radicals are derived with 1 to 8 moles of ethylene oxide, which esters are liquid at the processing temperature in the range of from 10° to 160°C, until the total amount of phosphorus used forms a firm coating on the granules.

It was surprising and could not have been foreseen that in this manner coatings can be produced with large amounts of red phosphorus which have a sufficient resistance to abrasion in the usual handling, since according to the state of the art the thermoplast granules always contain the required amount of phosphorus distributed in the mass and not applied to the surface only. It was also surprising that the granules coated according to the invention extinguish automatically after having been inflamed by a Bunsen burner as soon as the burner is removed, even if they contain a high amount of phosphorus, and that they can be handled without any risk. Furthermore, it could not have been foreseen that the phosphoric acid ester remaining in the thermoplast when the granules are further processed, for example into injection molded articles neither influence the processing properties nor detrimentally affect the mechanical properties of the final products. A deterioration of the mechanical properties could have been expected in view of the fact that especially the tertiary phosphoric acid esters are known as plasticizers.

Inflammable thermoplasts which can be provided with a flame-retardant finishing in accordance with the invention are especially linear polyesters and polyamides, possibly in colored form or reinforced by fibers. The flame-retardant finishing can also be applied to other thermoplasts provided that their finishing with red phosphorus has a flame-retardant effect. For coating all usual types of granules are suitable as used for processing on injection molding machines and for the production of semi-finished goods.

The red phosphorus is used in finely ground form and in stabilized quality having a particle size of about 10 microns or below. It may contain a small proportion of coarser grains of up to about 150 microns. The amounts of red phosphorus applied to the granules is in the range of from 0.5 to 45, preferably 2 to 5 % by weight, calculated on the thermoplast.

Suitable esters of orthophosphoric acid are mono-, di-, and tri-esters, which are liquid or waxy at room temperature and have the formulae $H_2RPO_4$, $HR_2PO_4$ and $R_3PO_4$ in which R represents the radical of a straight chain or branched aliphatic alcohol having from 2 to 18 carbon atoms, the radical of a phenol carrying at most three alkyl side chains having from 1 to 9 carbon atoms, or the radical of an alcohol obtained by reacting the alcohols or phenols from which the aforesaid radicals are derived with 1 to 8 moles of ethylene oxide. Mono- and diesters are preferred, optionally in the form of 1 : 1 mixtures each carrying the same radical R. Alternatively, mixtures of different acid and neutral esters can be used. Those esters or ester mixtures are chosen which at the coating temperature in the range of from 10° to 160°C have a viscosity not exceeding 1,000 centipoises. Suitable esters are, for example mono-diisotridecyl phosphate, mono-dinonylphenol-tetraglycol ether phosphate, mono-ditributylphenol-tetraglycol ether phosphate, di-2-ethylhexyl phosphate, and tricresyl phosphate. The ester or ester mixtures are used in an amount of from 2 to 15, preferably 5 to 10 % by weight, calculated on the amount of phosphorus used.

Depending on the amount of red phosphorus applied to the granules mixing is performed on a roll mill, in containers mostly of cylindrical shape rotating on a gyrowheel, or in eccentric tumbling devices. Working under inert gas, for example nitrogen, is required, in order to ensure that the red phosphorus giving off considerable amounts of dust does not explode before being completely wetted by the phosphoric acid ester.

Phosphorus and phosphoric acid ester can be added to the granular thermoplast in any order of succession, it is important, however, to add the two components not simultaneously but successively after a short mixing with the first added component, so that the formation of lumps in avoided. According to a preferred mode of operation first the ester is applied to the granules and then the desired amount of phosphorus is added. In some cases it is also possible to coat the granules with a previously prepared homogeneous mixture of phosphorus and phosphoric acid ester.

When the phosphoric acid esters used are viscous or solid, mixing is performed at elevated temperature in order to bring about rapid homogenization by viscosity reduction or melting of the ester. The temperatures used are in the range of from 10° to 160°C, preferably 20° to 80°C.

Besides the flame retardant further additives and auxiliaries may be applied to the granules, for example pigments, such as carbon black, to cover the color of the phosphorus, crystallization promotors (monotanates), mold release auxiliaries, stabilizers against oxidation and thermal degradation, and the like.

The coated granular thermoplast can be directly molded on injection extrusion machines into shaped articles with flame retardant finishing or on the extruder to give semi-finished goods. It is likewise possible to regranulate the granules, optionally after addition of further additives, for example glass fibers, without any danger and without dust formation. In this manner granules are obtained in which all additives are homogeneously distributed.

The following examples illustrate the invention.

EXAMPLE 1

In a 20 liter vessel with screwed-on cap 10 kg of granular polyethylene terephthalate containing 20 % of glass fibers and having a reduced specific viscosity of 0.8 dl/g, measured with 1 g of polymer in 100 ml of a 3 : 2 mixture of phenol/tetrachloroethane at 25°C, were mixed under nitrogen at room temperature for 30 minutes on a gyrowheel with 400 g of finely ground red phosphorus and 20 g of coloring carbon black. Next, 40 grams of mono-diisotricresyl phosphate were added and mixing was continued for 15 minutes. After said period of time, the components were completely mounted on the granules.

EXAMPLE 2

10 Kilograms of granular polyethylene terephthalate having a reduced specific viscosity of 1.35 dl/g were preheated to 110°C in a drying cabinet. The hot granules were transferred into a container, 20 g of mono-dinonylphenol-tetraglycol ether phosphate were added and the mixture was mixed for 10 minutes on the gyrowheel. After having replaced the air in the container by nitrogen, 250 grams of red phosphorus and 40 g of the sodium salt of a crude montan wax oxidation product having an acid number of 100 were added and mixing was continued for 20 minutes. A product was obtained coated with the total amount of phosphorus. Dusty fractions were not observed.

EXAMPLE 3

An eccentric tumbling device provided with heating jacket and having a capacity of 2.5 cbm was charged under nitrogen with 1,000 kg of polyethylene terephthalate having a reduced specific viscosity of 0.8 dl/g and containing 20 % of glass fibers, 35 kg of red phosphorus, 2 kg of coloring carbon black and 2 kg of the sodium salt of a montanic acid. While tumbling the mixture was heated to 100°C, 3 kg of mono-ditributylphenoltetraglycol ether phosphate were added and tumbling was continued for 20 minutes. The product withdrawn from the tumbler was free from dust, the phosphorus was quantitatively mounted on the granules.

EXAMPLE 4

300 Grams of polyamide 6.6 granules and 3.6 g of monodiisotridecyl phosphate in a 1 liter flask were rolled for 5 minutes on a set of rolls. 50.0 Grams of red phosphorus were added and rolling was continued for 10 minutes. After said period of time, the dusty phosphorus had been quantitatively taken up by the granules. When rolling was further continued for another hour the granules which were uniformly coated with the phosphorus, acquired a glossy aspect.

EXAMPLE 5

In the manner described in Example 4, 300 g of granular polyamide 6.6 were mixed for a short period of time with 2.3 g of tricresyl phosphate and then 24.3 grams of red phosphorus were mounted. The coating obtained was not so uniform as in the preceding example, it was preferably along the cutting edges of the granules.

EXAMPLE 6

In the manner described in Example 4, 210 g of granular polyamide 6.6 heated to 80°C were rolled, first with a mixture of 9 g of mono-diisotridecyl phosphate and 4 g of mono-dinonylphenol-tetraglycol ether phosphate and then with 90 g of red phosphorus.

What is claimed is:

1. Process for applying red phosphorus to granules of inflammable thermoplasts to give them a flame-retardant finishing, which comprises intensely mixing the granules in an atmosphere of an inert gas with 0.5 to 45% of their weight of finely pulverized red phosphorus and 2 to 15% by weight, calculated on the phosphorus, of a mono-, di-, triester of orthophosphoric acid liquid at the processing temperature of from 10° to 160°C having at this temperature a viscosity not exceeding 1,000 cps and having the formulae $H_2RPO_4$, $HR_2PO_4$ and $R_3PO_4$ in which R represents the radical of a straight chain or branched aliphatic alcohol having from 2 to 18 carbon atoms, the radical of a phenol carrying at most three alkyl side chains having from 1 to 9 carbon atoms, or the radical of an alcohol obtained by reacting the alcohols or phenols from which the aforesaid radicals re derived with 1 to 8 moles of ethylene oxide, until the total amount of phosphorus used forms a firm coating on the granules, the red phosphorus and the phosphoric acid ester or ester mixture being applied to the granules one after the other in any order of succession.

2. The process of claim 1, wherein a mixture of phosphoric acid esters is used.

3. The process of claim 1, wherein a previously prepared homogenerous mixture of red phosphorus and phosphoric acid ester or ester mixture is used to produce the coating.

4. Flame-retardant granules of polyamides or polyesters optionally containing glass fibers provided with a coating of red phosphorus and phosphoric acid esters as claimed in claim 1.

* * * * *